Dec. 23, 1969     O. BOSSI     3,485,164
MOUNTING TYPE CARRIERS ON A SHAFT
Filed Dec. 19, 1967
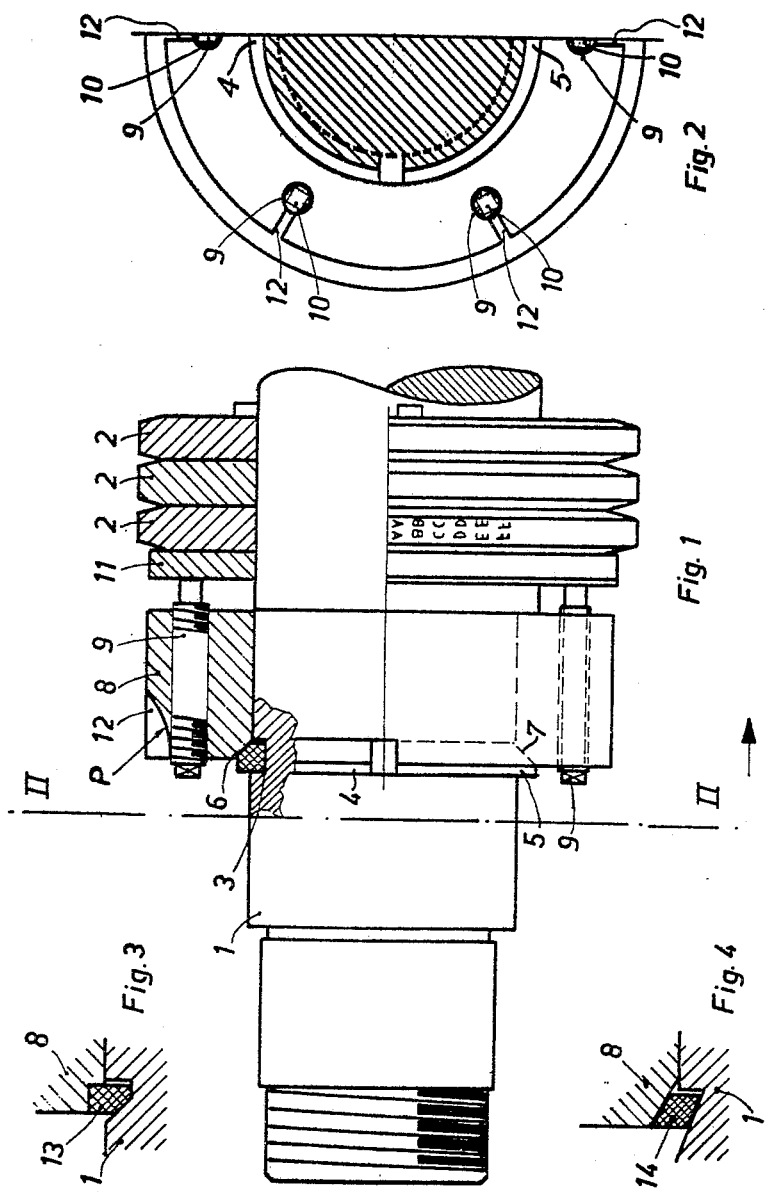
INVENTOR.
OSCAR BOSSI United States Patent Office 3,485,164
Patented Dec. 23, 1969

3,485,164
MOUNTING TYPE CARRIERS ON A SHAFT
Oscar Bossi, Turin, Italy, assignor to General Electric Information Systems S.p.A., Caluso, Turin, Italy, a corporation of Italy
Filed Dec. 19, 1967, Ser. No. 691,843
Claims priority, application Italy, Dec. 20, 1966, 31,311/66
Int. Cl. B41j 1/22
U.S. Cl. 101—110
6 Claims

ABSTRACT OF THE DISCLOSURE

A device for fastening type-carrying rings on the shaft of high speed print wheels, comprising a pressure collar engaging the conical surfaces of two half rings housed in a groove on the shaft.

The invention relates to a device for accurately positioning and fastening rings, hollow cylinders or drums on a common shaft, and in particular to a device for fastening the type carrying rings that are arranged to form the type drum for high speed printing machines.

This type of printing machine generally comprises a shaft on which a plurality of rings are assembled side by side, each ring carrying in relief, on its periphery, at least a font of type. These assembled rings, when fastened in a definite position, form a cylinder, on whose periphery the type sets are arranged in circular rings located in parallel planes, one ring for each printing position of the print line. These rings must maintain a fixed position, both with respect to one another and with respect to the shaft. This result is obtained by applying sufficient pressure in a direction parallel to the axis of the shaft, on the set of the rings which are assembled side by side. According to the prior art, means for applying such pressure is either a threaded metal collar screwed on the shaft, or a pressure collar, slidably fitted on the shaft, which pressure collar carries a plurality of tightening screws pressing the type rings together. In such a case, the pressure collar is retained in place by an elastic ring housed in a groove on the shaft. Such arrangements are generally too expensive, due to the high precision machining required, or not very reliable, due to the strain to which the elastic ring is subjected.

A device made according to the invention negates such inconveniences by providing a slidable pressure collar, carrying the tightening screws, and rigid abutment means for the same, located in a proper housing on the shaft, and provided with at least a conical surface, so that the longitudinal pressure acting on the abutment means locks them safely in their housing.

This arrangement is rather inexpensive and very reliable, and provides an absolute rigid and stable abutment for the pressure collar, thus ensuring that the longitudinal pressure which assures the stability of the type ring position, does not change with time.

These and other features and advantages of the invention will appear from the following description of an illustrative embodiment thereof, with reference to the accompanying drawings, in which:

FIG. 1 shows a side view, partially in section, of one end of the type ring carrying shaft.

FIG. 2 shows a partial axial view of the type ring carrying shaft from a section taken along line II—II of FIG. 1.

FIG. 3 and FIG. 4 show modifications of the device.

With reference to FIG. 1, reference numeral 1 refers to the shaft on which the type rings 2 are assembled side by side, bounded at their left by an intermediate ring 11. Two substantially semicircular steel half-rings 4 and 5 are located in a groove 3 provided on the periphery of shaft 1 and having a rectangular cross-section. Both half rings 4 and 5 are provided with external conical convex surfaces or chamfered edges 6 and 7. Such conical surfaces form a convenient angle, for example 45°, with the axis of the shaft. A pressure collar 8, slidably fitted with minimum clearance, on the shaft 1, is provided with a corresponding concave conical surface which engages the convex conical surfaces of the half rings 4 and 5.

The pressure collar 8 is provided with a convenient number of threaded holes 9, for example six, into which a corresponding number of screws are screwed. These screws apply a pressure to the intermediate ring 11 which in turn transmits such pressure to the type rings 2, locking them firmly in their position.

In coincidence with the threaded holes 9, the pressure collar 8 is provided with corresponding radial slots so that a relatively large portion of the bottom of the slot is sufficiently close to the corresponding threaded hole while leaving a small thickness of material. This may be obtained, for example, by means of a disk milling cutter of relatively large diameter. When the thrust screws 10 are completely screwed in place, a thin chisel may be introduced into the slots, and, by a stroke on a chisel the female thread of the hole is deformed, as for example, at P. Therefore, no subsequent loosening of the pressure screw by jars or vibrations can take place. However, it is always possible to unscrew the pressure screws if a sufficient torque is applied by proper means to the threads of the screws, when the type rings must be disassembled.

The assembly of the pressure collar 8 and of the abutment half-rings may be carried on as follows:

After having assembled the type rings 2 and the intermediate ring 11 on shaft 1, the pressure collar 8 is placed on the shaft. The collar 8 is pushed to the right until the groove 3 is free, and half rings 4 and 5 are put in place therein. The pressure collar then is moved to the left, in such a way that its concave conical surface engages the corresponding convex conical surfaces of the rings, which are therefore safely and firmly locked in the groove. Thereafter, the pressure screws 10 are screwed into the threaded holes 9 of the pressure ring 8, until they apply the desired pressure to the intermediate collar 11. At the opposite end of the shaft, not shown in the drawings, the set of the rings may be retained by a fixed abutment ledge provided on the shaft, or by a similar pressure collar, held in place by two abutment half rings, as described. When the desired pressure is attained, the screws 10 are locked by a stroke on a thin chisel introduced into the slots 12 as described.

According to a modification, as shown in the section in FIG. 3, the cross-section of the peripheral groove shows a conical convex surface having a convenient angle, for example 45°. The half rings 13 correspondingly show a conical concave surface which engages the convex surface. In this case, the pressure ring is provided with a rectangular recess which may contain the portion of the half rings 13 which project out of the groove.

As shown in FIG. 4, both the exterior and the interior surfaces of the half rings 14 may have a conical portion, preferably with different angles, engaging correspondent conical surfaces provided on the groove and on the pressure collar.

Three of four abutment means, formed by portions of rings extending in arcs of 120° or 90° respectively, may be located in the groove in place of two half rings 5 and 6. Likewise, combinations of rings having different arc sizes may be used.

What is claimed is:

1. A type assembly for high speed printers comprising a type ring mounted on a central shaft and means for retaining said type ring in a fixed position relative to said shaft, said retaining means comprising a fixed abutment ledge on said shaft on one side of said type ring, an intermediate ring in abutment with said type ring, a groove in said shaft, a split ring in said groove of said shaft, a pressure collar, including a plurality of threaded apertures each in a plane parallel to the longitudinal axis of said shaft, and mounted on said shaft between said split ring and said intermediate ring and in abutment with said split ring on the other side of said type ring, and threaded screws extending through said threaded apertures of said pressure collar and against said intermediate ring.

2. A type assembly for high speed printers comprising a plurality of type rings mounted on a central shaft and means for retaining said type rings in a fixed position relative to said shaft, said retaining means comprising a fixed abutment ledge on said shaft at a one exteriormost extremity of said type rings, an intermediate ring in abutment with the other exteriormost of said type rings, a groove in said shaft, a split ring in said groove of said shaft, a pressure collar, including a plurality of threaded apertures each in a plane substantially parallel to the longitudinal axis of said shaft, and mounted on said shaft between said split ring and said intermediate ring and in abutment with said split ring, and threaded screws extending through said threaded apertures of said pressure collar and against said intermediate ring.

3. A type assembly as defined in claim 2, said split ring in said groove including a chamfered edge on the side nearest said pressure collar, and said pressure collar having a complementary edge to abut said chamfered edge.

4. A type carrier assembly as defined in claim 2, wherein said abutment ledge comprises a second groove on the shaft, a split ring in said second groove, a second pressure collar, including a plurality of threaded apertures each in a plane substantially parallel to the longitudinal axis of said shaft, and mounted on said shaft between said split ring and said intermediate ring and in abutment with said split ring, and threaded screws extending through said threaded apertures of said pressure collar and against said intermediate ring.

5. A type assembly as defined in claim 2, wherein said split ring in said groove has a conical surface on the side nearest said pressure collar, and said pressure collar having a complementary conical surface.

6. A type assembly as defined in claim 2, said split ring in said groove having a conical surface on the side farthest from said pressure collar, and the said groove being provided with a complementary conical surface.

References Cited

UNITED STATES PATENTS

| | | | |
|---|---|---|---|
| 2,111,121 | 3/1938 | Mills | 101—96 |
| 2,957,410 | 10/1960 | Traphagen | 101—110 |
| 3,327,626 | 6/1967 | Clark et al. | 101—110 |
| 3,385,213 | 5/1968 | Stephan | 101—110 |

WILLIAM B. PENN, Primary Examiner

U.S. Cl. X.R.

29—125; 101—99